United States Patent
Brandenstein et al.

Patent Number: 4,790,203
Date of Patent: Dec. 13, 1988

[54] WORM GEAR

[75] Inventors: Manfred Brandenstein, Eussenheim; Horst-Manfred Ernst, Eltingshausen, both of Fed. Rep. of Germany

[73] Assignee: SKF GmbH, Schweinfurt, Fed. Rep. of Germany

[21] Appl. No.: 106,607

[22] Filed: Oct. 8, 1987

[30] Foreign Application Priority Data

Oct. 15, 1986 [DE] Fed. Rep. of Germany ....... 3635040

[51] Int. Cl.$^4$ ............................................. F16H 25/24
[52] U.S. Cl. ................................. 74/424.8 R; 74/459
[58] Field of Search ................ 74/89.15, 424.8 R, 459

[56] References Cited

U.S. PATENT DOCUMENTS 4,679,458 7/1987 Brandenstein et al. ........ 74/424.8 R

FOREIGN PATENT DOCUMENTS 2171171 8/1986 United Kingdom ............... 74/89.15

Primary Examiner—Allan D. Herrmann
Attorney, Agent, or Firm—Rosen, Dainow & Jacobs

[57] ABSTRACT

In a worm gear comprised of a nut and a threaded spindle, the groove bottoms of the threads are provided with a central support projection, and a radially deeper region is provided adjacent the projection on both sides thereof. When radial forces act in the same direction at both ends of the worm gear, the projection serves as a radial support projection with sufficient axial play. By providing convexly curved thread flank surfaces, for example on the nut, the threads run under the same conditions also when the axes of the nut and spindle are inclinded to one another as a result of the application thereto of inclined forces. As a consequence, axial play is reduced. Clamping of the threads is avoided in this case, however, since the support projection hinders a wedging action between the threads of the worm gear.

4 Claims, 2 Drawing Sheets

WORM GEAR

BACKGROUND OF THE INVENTION

This invention relates to worm gears, and is more particularly directed to improvements in the shape of the threads of worm gear for the purpose of, for example only, avoiding clamping of the threads thereof when the gears are subject to inclined forces.

A worm gear of known type, such as disclosed, for example, in U.S. Pat. No. 4,679,458, is advantageously employed for the translation of rotational movements to linear movements. By employing a correspondingly larger thread pitch, the function of this gear can be reversed, i.e. to translate linear movements to rotational movements. Instead of employing only a single thread, it is alternatively possible to employ multiple threads, so that with the same load carrying capacity is attained with a higher pitch. The threads have trapezoidal cross sections, whereby relatively large surface thread flanks are provided, thereby attaining a higher load carrying capacity. Under axial loading it is attampted as much as possible for the loading to be distributed over the entire thread length. In other words, the threads of the spindle and of the nut must be made with extremely low tolerance. In order to avoid the necessity of manufacturing the threads with all of the thread dimensions having extreme accuracy, and to avoid the necessity of matching of individual threads, the spindle is provided in many cases with minimum axial play with respect to the nut, whereby a minimum gap results between the unloaded thread flanks under pure axial force.

The gap occurs on the other thread flanks of the outer and inner threads under reverse axial loading. In the case of radial loading on the other hand both thread flanks of the inner threads are in contact with the corresponding flanks of the outer threads at the corresponding circumferential positions of the threads. The known arrangement is so constructed that in this case for example a contact occurs in the region of the loaded thread flanks between the thread crown surface of the inner thread and the groove bottoms of the outer threads.

In complex force distribution the case can arise wherein the nut becomes inclined or is tipped with respect to the spindle. This limiting case disadvantageously affects the function of the worm gear, especially if rotation of the spindle due to the linear movement of the nut is desired or if rotation of tho nut responsive to linear movement of the spindle is desired. Due to the inclined position of the nut and spindle, the support surface is reduced to a minimum and it remains as only a disappearingly small line contact, or even a point contact, on two radial or axial opposed transition regions of the thread flanks to the thread crown surfaces of the outer thread on the threaded spindle with the corresponding partial surface of the inner threads of the nut. In many cases this inclined position results in clamping with small deformation of the contact surfaces. A relative rotation between the nut and spindle is possible in this case only with difficulty. In the above example the translation of linear of rotational movement results in self-locking, which no longer permits movement. The inclined position must be first corrected in order to insure proper functioning of the worm gear.

In the known arrangement the threads become supported over the inclined surfaces on the groove bottoms in response to tipping forces. Clamping is thereby almost avoided. In the sense of smooth functioning of the worm gear it is not necessary that the threaded surfaces remain in contact. Contact can also occur here; it must only be taken into consideration, however, that none of the force components resulting from the inclined force occur in the region of the thread flanks. This is not always possible, however, due to tolerance errors resulting from manufacturing requirements.

SUMMARY OF THE INVENTION

It is an object of this invention to provide a worm gear of the above described type that has functions well in response to inclined forces between the nut and the threaded spindle.

This object is solved by providing the thread flanks of at least one thread with a convex cross section in the radial direction and providing the groove bottom of at least one thread with a central extending support projection, and by providing a radially deeper edge region on both sides of the projection, whereby between the transition region of the thread flanks to the thread crown surface of the one thread and the bottom surface of the edge region of the other thread at least a minimum gap is provided, when the maximum inclined position of the threads with respect to one another occurs.

Due to the convex curvature of the flanks of one of the threads, edge contact and therewith high surface pressure is avoided also under conditions of extreme mutual displacement of the threads, as when the tipping force occurs on the outer thread. The convex curvature extends over the entire height of the thread flank in the radial direction, with a large radius, so that there is an extremely small curvature. Upon the occurrence of the above discussed displacement of the threads with respect to one another, a curved section of one thread flank is always in contact with the thread of the other thread. Edge or corner regions do not engage one another.

The ability of the threads to move freely while in relatively inclined positions is consequently improved. The support projection in the center of the groove bottom serves for the radial support for the crown surface of the other thread. The corresponding transition regions of these threads between the thread flanks and the crown surfaces can thereby extend without contact in the free space formed between the support projection and the laterally adjacent, radially deeper edge regions. Precise formation of the edge regions is thereby not only not necessary with respect to the dimensions but also not necessary with respect to the outer surface quality. Only the running surface of the support projection need be precisely formed in order to produce a smooth sliding movement also during the occurrence of inclined position. It is thereby expedient to round the edge surfaces of the threads.

A completely convex rounding is, according to a further feature of the invention, especially advantageous.

In accordance with a still further feature of the invention the thread flank of the other thread lying on the convex cross section thread flank of the one thread is curved with a comparatively larger radius. As a result of this feature improved bevelling of the thread flanks that lie on one another is provided and the differential surface force is thereby reduced. This provides the further advantage with respect to the provision of a freely movable arrangement.

BRIEF FIGURE DESCRIPTION

In order that the invention may be more clearly understood, it will now be disclosed in greater detail with reference to the accompanying drawings, wherein.

DETAILED DISCLOSURE OF THE INVENTION

Figure 1:
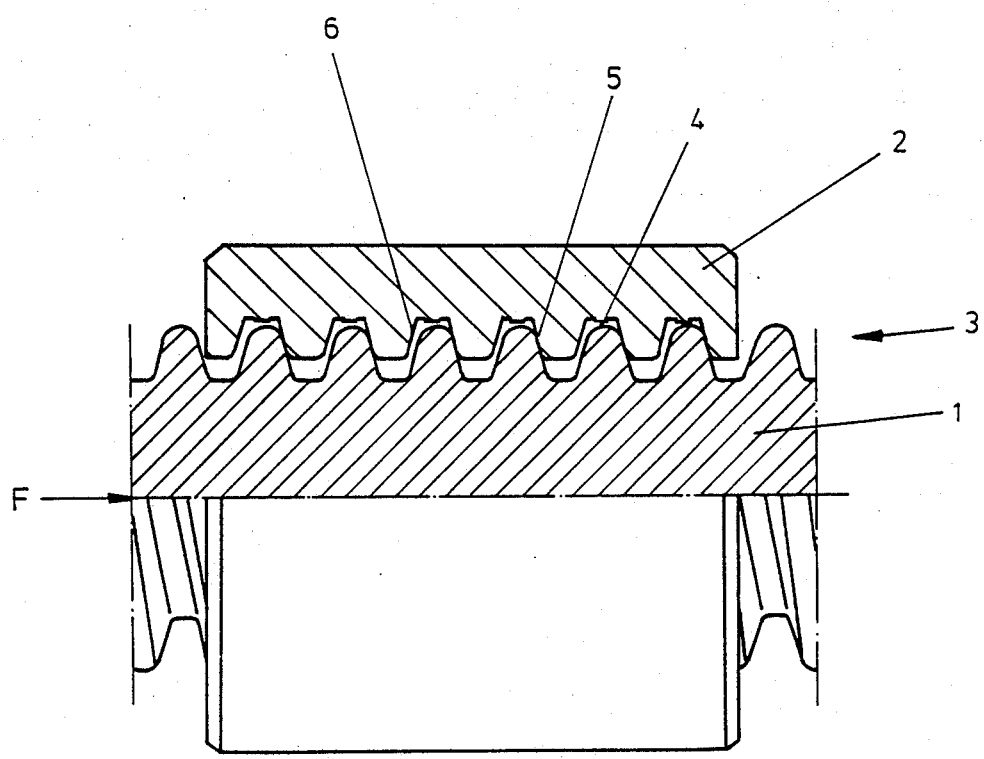
FIG. 1 is a partial lengthwise cross sectional view of a worm gear in accordance with the invention.

The worm gear illustrated in FIG. 1 is comprised of a threaded spindle 1 and a nut 2, coupled to one another by substantially trapezoidal threads. The inwardly directed threads 3 of the nut 2 and the outwardly directed threads 3 of the threaded spindle 1 are so dimensioned, with respect to one another, that axial as well as radial play is provided. If the threaded spindle 1, as shown, is axially forced against the nut 2 with a force F as shown, the inclined thread flanks 5 produce a centering action, so that at least theoretically a constant gap 4 occurs over the whole circumference, corresponds to the radial play. In this condition one of the thread flanks 5 runs along the entire length of the threads 3 inside of the nut in contact with the corresponding thread flank 5 of the threaded spindle 1. At the other thread flank 5 there is a gap 6 which conforms to the axial play. The pitch of the threads 3 is relatively large, whereby the nut 2 experiences a turning moment in response to the force F.

Figures 2, 3:
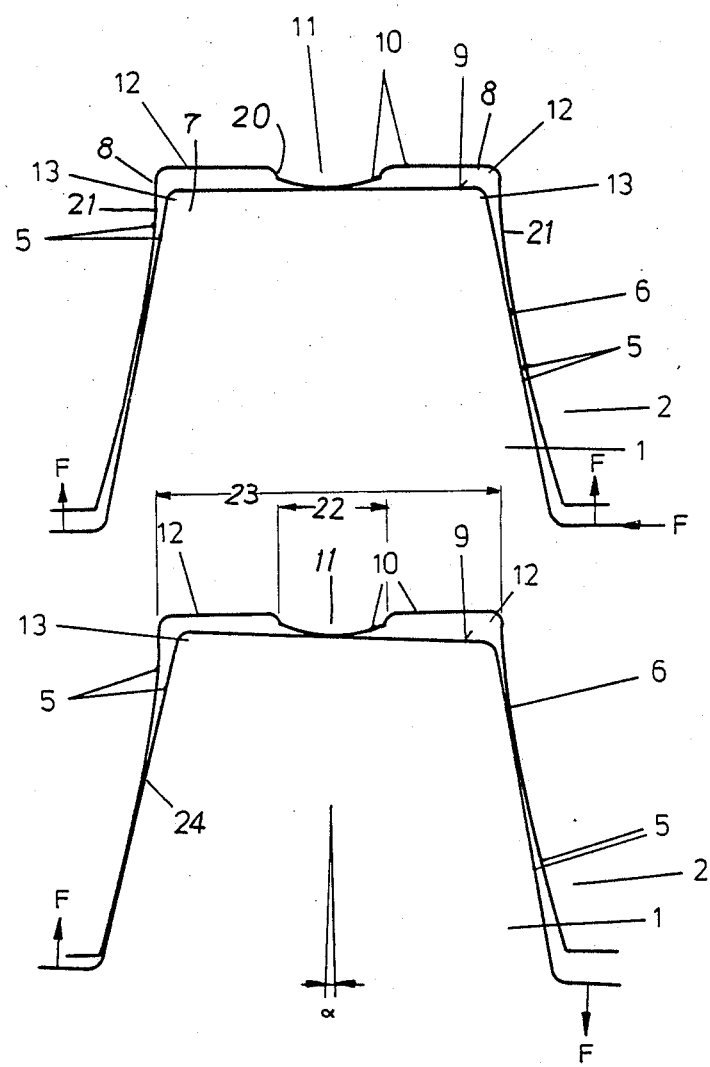
FIG. 2 is an enlarged lengthwise cross section view of a thread of the worm gear of FIG. 1, with uniform radial loading.
FIG. 3 is a cross section view of the thread as shown in FIG. 2, but with inclined positions of the threaded spindle with respect to the nut.

The radial and axial play have a predetermined relationship to one another. This is apparent in FIG. 2, wherein the upper left threaded region 7 of FIG. 1 of the threaded spindle 1 and the corresponding section of the thread groove 8 of the nut 2 are illustrated. Radial forces F act on the threaded spindle 1 acting in the same direction, whereby the spindle is displaced radially toward the nut 2 an amount equal to the radial play. Consequently the gap 4 disappears and the thread crown surface 9 engages the groove bottom 10. The axial play in this position is not very large, so that a gap remains between the thread flanks. In FIG. 2 the gap 6 only shown on the right thread flank 5 for clarity, at which position it is recognizably distinct. This position results from minimum axial force. The gap 6 can occur equally as well on the left thread flank 5 in response to the opposite axial force. The groove bottom 10 is provided with an axially central radially inwardly extending support projection 11. A radially deeper corner region 20 (i.e. having a greater diameter) is adjacent the projection 11 on both sides thereof. The profile of the support projection 11 is convexly rounded. The thread flanks 5 of the nut 2 are slightly convexly rounded, 21, in the radial direction.

FIG. 3 illustrates the left upper region of the worm gear of FIG. 1 with an inclined position between the nut 2 and the threaded spindle 1 in response to a tipping force F as shown. In this position the axes of symmetry of thread motion of the nut 2 and the threaded spindle 1 are at a slight angle to one another. Due to the convex curvature of the thread flanks 5 of the nut 2, there also exists in this inclined position the same contact relationship as existed in the non-inclined condition of FIG. 2. There is consequently no great differential surface force as in the case of conventional threads. The threads 3 are dimensioned so that even in the maximum inclined position according to FIG. 3 a minimum or very small axial gap still results, although this is not as readily apparent in the illustration of FIG. 3. In this circumstance, however, the threads 3 of the threaded spindle can not become clamped with both of its thread flanks 5 in the nut 2. The support projection 11 contributes to this result with its convexly rounded crown, which supports the threaded spindle 1 on its thread crown surface 9 to hinder further radial approach of the threads. The transition region 13 between the thread flank 5 and thread crown surface 9 can be separated from the respective edge region 12 of the nut 2 without contact as illustrated in FIG. 3. The radius of curvature of the support projection 11 and the radial depth of the edge region 12 have been shown with exaggeration in order to more clearly explain the invention.

In accordancce with the invention, the width 22 of the support projection is preferrably about one third of the entire width 23 of the groove bottom. Further, it is preferred that the thread 24, other than the convexly curved one thereof whose crown engages the support projection, has a convex surface (not shown) with a radius greater than that of the thread which it engages.

While the invention has been disclosed with reference to a single embodiment, it is apparent that there are many variations and modifications thereof, and it is intended in the following claims to cover each such variation and modification as falls within the true scope of the invention.

What is claimed is:

1. In a worm gear having an outwardly directed thread on a spindle and an inwardly directed thread on a nut and meshed with said outwardly directed thread, said inwardly and outwardly directed threads having similar trapezoidal shapes for their entire lengths, whereby when the threads are inclined to one another, the tipping force receiving contact point or contact section is exclusively on the thread crown surface of the respective thread region of at least one of said threads, and whereby under radial forces acting in the same direction at the two ends of the threads, the two threads exhibit small or no axial play with respect to one another and the thread crown surface of said one thread engages the corresponding section of the groove bottom of the other thread;

the improvement wherein the thread flanks of at least said one thread have a convex profile in the radial direction and the groove bottom of at least one thread comprises a central support projection extending therealong and a radially deeper edge region adjacent each side of the support projection, whereby at least one gap is provided between the transition regions of the thread flanks and the thread crown surface of the one thread and the edge region of the groove bottom of the other thread at the maximum inclined position of the threads to one another.

2. The worm gear of claim 1 wherein the support projection has a slightly convexly rounded cross section.

3. The worm gear of claim 1 wherein the thread flank of the other thread, that engages said convex thread flank of said one thread, is curved with a comparatively greater radius.

4. The worm gear of claim 1 wherein the width of the support projection is about a third of the entire width of the groove bottom.

* * * * *